United States Patent [19]

Campbell et al.

[11] Patent Number: 5,290,581
[45] Date of Patent: Mar. 1, 1994

[54] WHIPPABLE, NON-DAIRY CREAM BASED ON LIQUID OIL (II)

[75] Inventors: Iain J. Campbell, Wellingborough; Alexander Lips, Pavenham; Wayne G. Morley, Wellingborough, all of Great Britain

[73] Assignee: Unilever Patent Holdings B.V., Vlaardingen, Netherlands

[21] Appl. No.: 869,939

[22] Filed: Apr. 17, 1992

[30] Foreign Application Priority Data

Apr. 17, 1990 [EP] European Pat. Off. ........ 91303439.3

[51] Int. Cl.$^5$ .............................................. A23D 7/00
[52] U.S. Cl. .................... 426/570; 426/585; 426/613; 426/602; 426/572
[58] Field of Search ............... 426/564, 570, 572, 613, 426/585, 602

[56] References Cited

U.S. PATENT DOCUMENTS

| | | | |
|---|---|---|---|
| 3,628,968 | 12/1971 | Noznick | 99/139 |
| 3,702,768 | 11/1972 | Finucane et al. | 99/136 |
| 3,764,346 | 10/1973 | Noznick et al. | 426/213 |
| 3,840,682 | 10/1974 | Kubata | 426/570 |
| 3,935,324 | 1/1976 | Persmark et al. | 426/572 |
| 3,944,680 | 3/1976 | van Pelt et al. | 426/564 |
| 4,668,520 | 5/1987 | Okonogi et al. | 426/564 |
| 5,135,768 | 8/1992 | Campbell | 426/570 |
| 5,149,557 | 9/1992 | Morrison | 426/570 |
| 5,190,781 | 3/1993 | Heteren | 426/570 |

FOREIGN PATENT DOCUMENTS

| | | | |
|---|---|---|---|
| 0191545 | 8/1986 | European Pat. Off. | |
| 0469656 | 2/1992 | European Pat. Off. | 426/570 |
| 2248791 | 5/1975 | France | |
| 0049228 | 11/1983 | Japan | 426/570 |
| 0094069 | 5/1985 | Japan | 426/570 |
| 1458568 | 12/1976 | United Kingdom | |

*Primary Examiner*—Jeanette Hunter
*Attorney, Agent, or Firm*—Cushman, Darby & Cushman

[57] ABSTRACT

The invention concerns whippable non-dairy creams (NDC's) that contain 15-60% of fat, wherein the fat consists mainly of a liquid oil. The NDC's further contain 0.005-3.0 wt.% of a food-acceptable inorganic salt, preferably $CaCl_2$.

21 Claims, No Drawings

WHIPPABLE, NON-DAIRY CREAM BASED ON LIQUID OIL (II)

So far whippable non-dairy creams are known, which comprise emulsions of an aqueous phase containing optionally one or more milk components and thickener and a vegetable fat phase, which contains vegetable fat and an emulsifier system. However, these creams do not normally contain significant amounts of liquid oils. High levels of liquid oil cause them to be unwhippable with an ordinary domestic, electrical whipper (e.g. a Kenwood-Chef).

In our earlier European patent application 90202076.7 we have disclosed non-dairy creams that may contain 15–60 wt.% of fat, wherein the fat consists of 20–85% of a liquid oil. However, the use of fats consisting of more than 85% of liquid oils is not disclosed.

In Japanese patent application 58116-647 whippable cream is disclosed, consisting of 0.1–2% of a sugar fatty acid, 0.5–5% of triglycerides having a melting point of at least 50° C. and 0.05–0.5% of pyrophosphoric acid or its salts. The rest of the fat phase may consist of cottonseed oil, palm oil, corn oil or soybean oil. However, in order to make these whippable creams, it is necessary to use sugar fatty acid compounds and pyrophosphoric acid. Moreover, it is not clear from this reference how much of a liquid oil, especially an oil rich in PUFA, can be present in the composition. From GB 2,162,039, NDC's based on vegetable fats are known that contain a soybean aqueous infusion, a soy cellulose admixed with vegetable oil and/or hardened vegetable oil and alginic acid derivatives or gelatin, a sugar ester and a polyphosphate salt. Therefore, these NDC's always contain a soybean aqueous infusion. Nothing is disclosed about the properties of NDC's having a high content of liquid oils, in particular high PUFA-liquid oils.

In US 3,979,526 whipping creams are described that consist of defatted milk products, e.g. dialysed milk, and a vegetable oil, which are emulsified. However, the products of this U.S. patent do not have a whipped cream structure, but are soft foams.

Japanese patent application 58086-056 describes whippable creams, which are made by pre-emulsifying a particular oil and fat, i.e. with a "rising melting point of 15–45° C." with quite a lot of milk solids. From this reference nothing can be concluded about the properties of whippable NDC's having a high content of PUFA-rich liquid oils.

GB 2,080,325 discloses margarine emulsions having a fat-continuous phase that are made from emulsions having a water-continuous phase. The fat phase consists partly of globular fats which are coated with a lipoprotein film. Nothing can be derived from this reference about NDC's having a high content of liquid oils.

We have now found whippable NDC's having a high content of liquid oils, in particular of high-PUFA liquid oils. These NDC's are therefore healthier than the known NDC's, while the other properties of these NDC's, like whipping time, overrun, viscosity and firmness, are very satisfactory.

Therefore, our invention is concerned in the first place with a whippable non-dairy cream (NDC) comprising an emulsion of a water-continuous phase, optionally containing one or more protein components, preferably caseinates and optionally thickeners and a fat phase, comprising fat and optionally an emulsifier system, wherein the NDC contains 15–60 wt.% of a substantially globular vegetable fat of which at least 85 wt.%, preferably at least 95 wt.%, consists of a liquid oil and the rest of a hard fat, while the NDC contains 0.005–3.0 wt.% of a food-acceptable salt derived from a divalent, trivalent or quadrivalent metal or alkali earth metal ion and is whippable within 6 minutes, preferably within 4 minutes, when using a domestic, electrical whipper (e.g. the Kenwood-Chef).

The mean droplet size of the fat particles in our NDC's is less than 5.0 μm, preferably less than 1.0 μm.

Although a non-dairy cream that contains $CaCl_2$ is known (Nestlé's product "Tip Top", which is based on hardened fat having a very low content of unsaturates), $CaCl_2$ or other salts could not be expected to improve the properties of non-dairy creams wherein very high levels of unsaturated oils are present. Our NDC preferably contains 25–50 wt.% of fat, while the hard fat can be chosen from the group consisting of palmkernel, hardened palmkernel, coconut, hardened coconut, hardened rapeseed oil, hardened palm oil, hardened soybean oil, butterfat and mixtures thereof. From these fats we preferably use a hardened mixture of palm oil mid-fraction and soybean oil, in particular a mixture of hardened palmkernel of melting point 38° C. and coconut. The two components of this last-mentioned mixture are preferably present in weight ratios of 25:75–75:25. Although the fat phase may contain butterfat, we prefer to limit the amount of butterfat in the NDC to a maximum of 10 wt.%, preferably less than 4 wt.%. At least part of the fat may be replaced by well-known fat replacers, e.g. polyol fatty acid polyesters. Examples of these polyesters are described in U.S. Pat. Nos. 3,600,186, 4,005,195 or EP Patent Publications Nos. 233,856, 236,288 and 235,836.

The salts of the divalent, trivalent or quadrivalent metal or alkali metal can be any food-acceptable salt derived from Mg, Ca, Al, Mn or Fe. Preferred salts are $CaCl_2$, $MgCl_2$, $MnCl_2$, $FeCl_2$ and $FeCl_3$. In general, the amount of salt is 0.005–3.0 wt.%, preferably 0.5–1.5 wt.%, based on the NDC. In particular, when salts other than $Ca^{2+}$ salts are used, we found that the properties of the whipped creams are very sensitively affected by the amount of salt applied (e.g. when $Fe^{2+}$ salts are used).

In the composition also an emulsifier system may be present. This emulsifier system may consist of any kind of known emulsifiers, but preferably Lactodan (= lactic acid esters of monoglycerides; a Grindsted product), lecithins, polyglycerolesters, DATA-esters (= diacetyl tartaric esters of mono- or diglycerides), polyoxyethylene sorbitan esters and/or monoglycerides are used. The most preferred emulsifiers do contain Triodan (= polyglycerolester), lecithin and/or Hymono (= monoglycerides), in particular those that are derived from unsaturated fatty acids or fats. Each individual emulsifier that is used in the NDC, is present in an amount of at least 0.002 wt.%. The total amount of emulsifier used is, in general, less than 0.80 wt.%.

The liquid oil that can be used is normally chosen from the group consisting of sunflower oil, safflower oil, rapeseed oil, maize oil, bean oil, ground nut oil, olive oil, grapeseed oil, walnut oil, hazelnut oil, cottonseed oil, sesami oil, linseed oil or fish oil. We prefer to use liquid oils containing 10–80 wt.% of polyunsaturated fatty acids (= PUFA), 4–18 wt.% of saturated fatty acids (= SAFA) and 12-80 wt.% of mono-unsaturated fatty acids (= MUFA).

The total fat phase of our NDC's preferably displays a PUFA/SAFA weight ratio ranging from 2.5-10.0.

The SAFA-level of the fat phase of our NDC's is preferably less than 30 wt.%.

In order to improve the taste of an NDC it is well known to add some amount of buttermilk component to the NDC. We therefore prefer NDC's that contain up to 10 wt.% of buttermilk powder (BMP).

The NDC's according to the invention may also contain thickeners. As thickeners the following compounds may be used: guar gum, locust bean gum, carrageenan, xanthan gum, alginates, cellulose ethers or mixtures thereof.

We found that, depending on the metal salt used and on the desired outcome, expressed in terms of overrun and Boucher of the whipped product, the amount and type of thickener may vary. However, it is preferred that 0.05-2.0 wt.% of one or more thickeners are present in our compositions. The NDC may further contain sugar and flavours.

The whippable NDC's can be obtained by making an emulsion of an aqueous phase containing a protein, an inorganic salt and thickeners and a fat phase containing the emulsifier system. These two phases may be homogenised at about 60° C., after which a homogenised premix might be obtained. This premix is treated with steam, according to a UHT-treatment (i.e. about 2.5 seconds with steam of about 150° C.), in order to sterilise the premix.

The sterilised premix is homogenised in one or two stages, after which a sterilised, homogenised product having a temperature of about 60° C. is obtained. This product is cooled and stored at a temperature of 5-10° C.

The NDC's having a high liquid oil content so obtained are whippable within 6 minutes. The NDC's according to this invention can also be used for the production of canned NDC's as aerosols, e.g. in the way as described in our earlier European patent application 90307036.5.

Examples I–VI

Creams were made consisting of the ingredients as mentioned in table I. the $CaCl_2$ or $FeCl_2$ was added to the cream at 5° C.

TABLE I

| Example | Sunflower Oil wt. % | Na-caseinate wt. % | $CaCl_2$ wt. % | Thickener wt. % |
|---|---|---|---|---|
| I | 45 | 2 | 0 | 0 |
| II | 45 | 2 | 0 | 0.2% Guar 0.1% LBG |
| III | 45 | 2 | 1 | 0.2% Guar 0.1% LBG |
| IV | 45 | 2 | 1 | 0.25% xanthan |
| V | 45 | 2 | 1 | 0.5% xanthan |
| VI | 45 | 2 | 0.15 $FeCl_2$ | 0.2% Guar 0.1% LBG |

After whipping for 5 minutes with a Kenwood Chef, the overrun and boucher of the whipped creams were measured. The results are mentioned in Table II. It is emphasized that "most desirable results" mean overruns of at least 150% and Boucher of more than 70.

TABLE 2

| Example | Overrun % | Boucher |
|---|---|---|
| I | 168 | <50 |
| II | 107 | <50 |
| III | 186 | 74 |
| IV | 228 | 72 |
| V | 171 | 89 |
| VI | 60 | 59 |

We claim:

1. Whippable non-dairy cream (NDC) comprising an emulsion of a water-continuous phase, and a fat phase, comprising fat wherein the NDC contains 15-60 wt. % of a substantially globular vegetable fat of which at least 85 wt.% consists of a liquid oil and the rest of a hard fat, while the NDC contains 0.005-3.0 wt.% of a food-acceptable salt derived from a divalent, trivalent or quadrivalent metal or alkali earth metal ion and is whippable within 6 minutes when using a domestic, electrical whipper.

2. Whippable NDC according to claim 1, which is whippable within 4 minutes.

3. Whippable NDC according to claim 1, wherein the NDC contains 25-50 wt.% of fat.

4. Whippable NDC according to claim 1, wherein the vegetable fat consists at least 95 wt.% of a liquid oil.

5. Whippable NDC according to claim 1, wherein the food-acceptable salt is an Mg, Ca, Al, Mn or Fe salt.

6. Whippable NDC according to claim 5, wherein the food-acceptable salt is $CaCl_2$, $MgCl_2$, $MnCl_2$, $FeCl_2$ or $FeCl_3$.

7. Whippable NDC according to claim 1, wherein the hard fat is chosen from the group consisting of palmkernel, hardened palmkernel, coconut, hardened coconut, hardened rapeseed oil, hardened palm oil, hardened soybean oil, butterfat or mixtures thereof.

8. Whippable NDC according to claim 7, wherein the hard fat is a mixture of PK 38 and CN with a ratio of the components within 25/75 and 75/25.

9. Whippable NDC according to claim 1, wherein the thickener is chosen from the group consisting of guar gum, locust bean gum, carrageenan, xanthan gum, alginates, cellulose ethers or mixtures hereof, and which is present in amounts of preferably, 0.05-2.0 wt.%.

10. Whippable NDC according to claim 1, wherein the protein component is a caseinate.

11. Whippable NDC according to claim 1, wherein the NDC contains less than 10 wt.% of butterfat.

12. Whippable NDC according to claim 1, wherein lactic acid esters of monoglycerides, lecithin, polyglycerol esters, diacetyl tartaric esters of mono- and/or diglyceride, polyoxythylene sorbitan esters, monoglycerides and/or mixtures of these are present as emulsifier.

13. Whippable NDC according to claim 12, wherein the polyglycerol esters, lecithin and monoglycerides are derived from unsaturated fatty acid or fats.

14. Whippable NDC according to claim 12, wherein less than 0.80 wt.% of emulsifier is present.

15. Whippable NDC according to claim 1, wherein the mean droplet size of the fat particles is less than 5.0 $\mu$m.

16. Whippable NDC according to claim 1, wherein the liquid oil is chosen from the group consisting of: sunflower oil, safflower oil, rapeseed oil, maize oil, bean oil, groundnut oil, olive oil, grapeseed oil, walnut oil, hazelnut oil, cottonseed oil, sesame oil, linseed oil or fish oil.

17. Whippable NDC according to claim 16, wherein the liquid oil has a PUFA content of 10-80 wt.%, a SAFA content 4-18 wt % and a MUFA content of 12-80 wt.%.

18. Whippable NDC according to claim 1, wherein the PUFA/SAFA weight ratio of the total fat ranges between 2.5 and 10.0.

19. Whippable NDC according to claim 1, wherein the SAFA level of the fat phase of the NDC is less than 30 wt.%.

20. Whippable NDC according to claim 1 wherein the water-continuous phase includes a protein component and a thickener; and the fat phase includes an emulsifier.

21. Whippable NDC according to claim 15 wherein the mean droplet size is less than 1.0 μm.

* * * * *